United States Patent
Klepper et al.

(10) Patent No.: US 6,351,131 B1
(45) Date of Patent: Feb. 26, 2002

(54) SPECIES-SELECTIVE PRESSURE GAUGE WITH EXTENDED OPERATION

(75) Inventors: C. Christopher Klepper; Robert C. Hazelton; John Niemel, all of Radford; Michael D. Keitz; Caterina Vidoli, both of Blacksburg, all of VA (US)

(73) Assignee: Hy-Tech Research Corporation, Radford, VA (US)

(*) Notice: Subject to any disclaimer, the term of this patent is extended or adjusted under 35 U.S.C. 154(b) by 123 days.

(21) Appl. No.: 09/591,711

(22) Filed: Jun. 9, 2000

(51) Int. Cl.[7] .............................................. G01L 21/34
(52) U.S. Cl. ...................................................... 324/463
(58) Field of Search ................................ 324/460, 463; 73/19.01, 19.02, 753; 250/281, 288, 294, 298; 315/111.01, 111.81, 339, 349

(56) References Cited

U.S. PATENT DOCUMENTS

| | | |
|---|---|---|
| 3,622,870 A | 11/1971 | Hamilton et al. |
| 3,872,377 A | 3/1975 | Kageyama et al. |
| 4,000,457 A | 12/1976 | O'Neal, III |
| 4,423,355 A * | 12/1983 | Kageyama ............. 315/111.81 |
| 4,440,995 A * | 4/1984 | Lange et al. ............. 200/144 B |
| 5,767,629 A * | 6/1998 | Baptist ....................... 315/168 |

OTHER PUBLICATIONS

D.L. Hillis et al., entitled "Deuterium–tritium concentration measurements in the divertor of a tokamak via a modified Penning gauge", Fusion Engineering and Design 34–35, pp. 347–351 (1997).

K. H. Finken et al., entitles "Measurement of helium gas in a deuterium environment", Reviews of Scientific Instruments, vol. 63, No. 1, pp. 1–7 (Jan. 1992).

C.C. Klepper et al., entitled "Application of a species–selective Penning gauge to the measurement of neon and hydrogen–isotope partial pressures in the plasma boundary", Reviews of Scientific Instruments, vol. 68, No. 1, pp. 400–403 (Jan. 1997).

C. C. Klepper et al., entitled "Divertor Neutral Pressure Enhancement with a Baffle in DIII–D", Nuclear Fusion, vol. 33, No. 4, pp.533–545 (1993).

* cited by examiner

*Primary Examiner*—Safet Metjahic
*Assistant Examiner*—E P LeRoux
(74) *Attorney, Agent, or Firm*—Dinesh Agarwal, P.C.

(57) ABSTRACT

A diagnostic method and apparatus includes a pressure gauge member having an enclosed housing, an anode plate, a pair of cathode plates sandwiching the anode plate, an anode connector at an external surface of the gauge, and a lead connecting the anode plate to the anode connector. Each of the anode plate, pair of cathode plates, and lead are confined within the gauge housing. A power supply is provided for supplying power to the anode connector, the power supply including a positive terminal and a negative terminal. A resistor is connected to each of the positive terminal of the power supply and the anode connector of the gauge member. A pair of electromagnets are positioned adjacent the gauge member, each electromagnet having a pole piece formed therein for completing a magnetic circuit outside of the gauge. A power amplifier supplies varying power to the electromagnets, and a feedback circuit is connected to the gauge, the power supply, the said power amplifier for proportionally and selectively changing a strength of the electromagnets upon detecting an opposing change in current discharge from the gauge.

27 Claims, 6 Drawing Sheets

SPECIES-SELECTIVE PRESSURE GAUGE WITH EXTENDED OPERATION

FIELD AND HISTORICAL BACKGROUND OF THE INVENTION

The present invention is directed to a species-selective pressure gauge with an extended operation of up to 10 Pascal and more. More specifically, the invention is directed to a species selective pressure gauge, such as a U.S. Penning gauge, in which an application of the Penning gauge will accurately analyze optical emission from a cold-cathode discharge.

The application of a cold-cathode ionization gauge, such as a Penning gauge, for neutral gas pressure measurements is known in the art. However, a problem exists in which the application thereof is limited to pressures below 1 Pascal. This problem is commonly overcome by use of alternative gas pressure sensors, such as a capacitance manometer. These alternative gas pressure sensors/gauges are not ionization gauges in that they do not generate an electrical discharge by ionization of the neutral gas. Therefore, even though the pressure of the neutral gas may be measured, the composition of the gas still cannot be accurately determined.

In the case of a species-selective gauge, the light emitted from the electrical discharge is analyzed to determine the composition of the gas. More specifically, the composition of the gas is analyzed to determine the relative concentration of the various gaseous species contained in the gas. Each species emits light at characteristic frequencies (colors) when excited by the electric discharge. As a result, it is essential to have an ionization-type gauge, in order to have a species selective gauge, based on this actinometric technique.

The use of gauges to analyze gas is therefore known. Some publications expressing and explaining the known concepts include U.S. Pat. Nos. 3,622,870; 3,872,377; and 4,000,457; and publications to D. L. Hillis, C. C. Klepper, M. Von Hellermann, J. Ehrenberg, K. H. Finken, G. Mank. "Deuterium-Tritium Concentration Measurements in the Divertor of a Tokamak via a Modified Penning Gauge". Fusion Engineering and Design (1997); K. H. Finken, K. H. Dippel and A. Hardtke. "Measurements of helium gas in a deuterium environment". Reviews of Scientific Instruments (1992); C. C. Klepper, D. L. Hillis, M. R. Wade et. al. "Application of a Species-Selective Penning Gauge to the Measurement of Neon and Hydrogen-isotope Partial Pressures in the Plasma Boundary". Rev. Sci. Instrum. (1997); and C. C. Klepper, J. T. Hogan, et.al. "Divertor Neutral Pressure Enhancement with a Baffle in DIII-D", Nucl. Fusion (1993).

Accordingly, a problem still exists in the art whereby it is necessary to determine at least the pressure, and further, the composition, of the neutral gas at pressures above 1 Pascal.

OBJECTS AND SUMMARY OF THE INVENTION

The present invention described herein, solves this problem in the art by extending the upper limit in the pressure range of operation of the species-selective gauge. This is done by continuously adjusting the operational parameters of the cold-cathode ionization gauge to maintain it in a non-saturated mode. If the measurement is done in a process where the gas pressure varies in time, specially designed electronics are employed to maintain the gauge in an operational state, where the optical measurements can be carried out and the calibration is maintained.

Therefore, it is a principal object of this invention to provide a species-selective gauge capable of measuring optical emissions at gas pressures above 1 Pascal.

Another object of the present invention is to provide a species-selective gauge for measuring optical emissions of a cold-cathode ionization gauge at gas pressures above 1 Pascal.

A further object of the invention is to provide a species-selective gauge for maintaining output emissions of a discharge in a non-saturated state.

A still further object of the invention is to provide an apparatus for a species-selective gauge in which a discharge current is monitored in order to correspondingly adjust a voltage applied to a magnetic field.

Yet another object of the invention is to provide an apparatus for a species-selective gauge in which an output of a magnetic field is monitored in order to correspondingly adjust the current input to the electromagnet and thereby maintain a constant current.

These and other objects of the invention are achieved by providing a diagnostic apparatus, which includes a pressure gauge member having an enclosed housing, an anode plate, a pair of cathode plates sandwiching the anode plate, an anode connector at an external surface of the gauge, and a lead connecting the anode plate to the anode connector. Each of the anode plate, pair of cathode plates, and lead are confined within the gauge housing. A power supply is provided for supplying power to the anode connector, the power supply including a positive terminal and a negative terminal. A resistor is connected to each of the positive terminal of the power supply and the anode connector of the gauge member. A pair of electromagnets are positioned adjacent to the gauge member, each electromagnet having a pole piece formed therein for completing a magnetic circuit outside of the gauge. A power amplifier supplies varying power to the electromagnets, and a feedback circuit is connected to the gauge, the power supply, the said power amplifier for proportionally and selectively changing a strength of the electromagnets upon detecting an opposing change in current discharge from the gauge.

BRIEF DESCRIPTION OF THE DRAWINGS

The above and other objects, advantages and novel features of the present invention will become apparent from the following detailed description of the preferred embodiment of the invention illustrated in the accompanying drawings, in which.

DETAILED DESCRIPTION OF PREFERRED EMBODIMENTS

At the outset, it should be understood that like reference numbers refer to like parts throughout this specification.

Further, at the essence of this invention is the premise that feedback control of the operational parameters of a cold-cathode discharge can extend the useful range of such an ionization gauge up to neutral pressure ten times or more the accepted pressure limit (approximately 1 Pa). This is of particular interest to the application of the Penning gauge as a species-selective sensor by analysis of the optical emission from the discharge.

Figure 1:
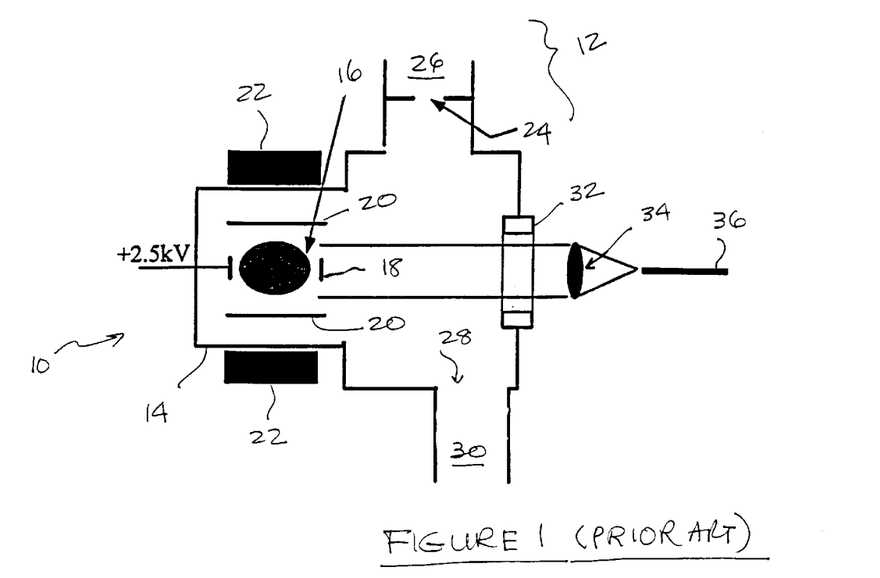
FIG. 1 is a schematic diagram showing a conventional species-selective Penning gauge diagnostic setup in the exhaust region of a magnetic fusion device, such as in the DIII-D pumped diverter.
Figure 2:
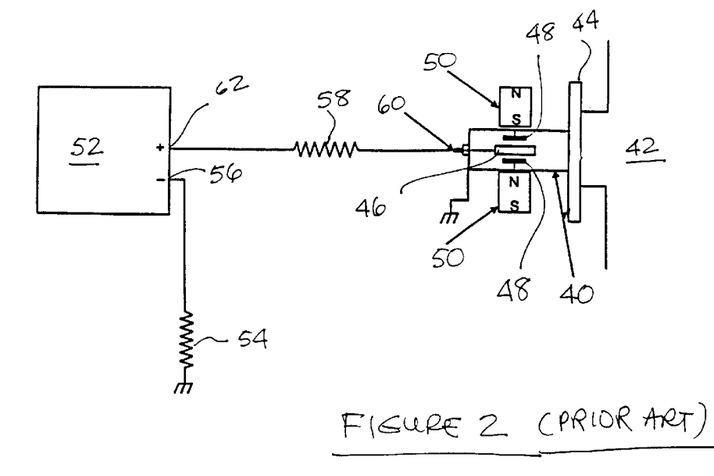
FIG. 2 is a schematic diagram showing a conventional species-selective Penning gauge assembly.

Referring first to FIGS. 1 and 2, two separate conventional apparatus relating to a Penning gauge are disclosed. The present invention is a modification of a known Penning apparatus as will be further described beginning at FIG. 3.

Referring first to FIG. 1, there is shown a conventional diagnostic apparatus, initially developed at the Research Center of Juelich, Germany, and later at the Oak Ridge National Laboratory for applications in magnetic fusion energy experiments. This diagnostic apparatus includes a commercial Penning-style gauge 10 in a diagnostic system 12 having a spectroscopic set-up to simultaneously measure the optical emission lines of a selected species, in order to determine their relative concentration in an effluent gas.

More specifically, the diagnostic system 12 includes a housing 14 of the Penning gauge having a light emitting volume 16 positioned within the housing. The light emitting volume 16 surrounds an anode member 18 and the anode 18 is supplied by a voltage of 2.5 kV. The anode 18 is sandwiched between cathode members 20, and the housing adjacent the light emitting volume is at least partially surrounded by permanent magnets 22. An orifice 24 in the housing limits the gas flow from a high-pressure (divertor) region 26, and another outlet 28 leads to a differential pump 30. The contents of the housing 14 is viewable through a window 32 and emission spectra passing through the window 32 are collimated in a lens 34 for transmission to a suitable data manipulation device (not shown) via an optical fiber 36.

In the preparation stage, the ratio of the emission lines is calibrated against the known partial pressures of species in a prepared gas mixture. The calibration tends to be dependent on the total pressure and must be monitored both in the calibration stage and during the fusion experiment. Due to the vibration noise during the latter, the measurement of the total pressure is usually done with an acoustically isolated capacitance manometer. Typical fusion applications of this diagnostic have been for (a) monitoring of helium content in a mostly hydrogen (or deuterium) effluent and (b) monitoring of tritium (T) in a mostly deuterium (D) exhaust. In the case of helium (or other inert gases), the spectroscopy consists of a beam-splitter and a set of two notch-filtered photo-multiplier systems. In the case of D/T, a high-resolution spectrometer is employed to resolve the Balmer-alpha lines of these hydrogen isotopes, which are only 0.6 Å apart.

Saturation phenomena limit the application of this diagnostic device shown in FIG. 1 to gas pressures significantly below 1 Pa. A well designed particle exhaust system in a tokamak fusion device attempts to build up high neutral pressures (1 Pa or higher), in order to achieve significant pumping with reasonable sized pumps. For example, in the diverter region of the DIII-D tokamak, neutral pressures in the 0.1–2 Pa range are typically achieved. The Penning gauge used in the partial pressure diagnostic begins to show saturation phenomena in the 0.5–1 Pa range and clearly saturates above 1 Pa. Presently, this hurdle is overcome by the use of differential pumping, which can introduce new problems. In the measurements of partial pressures of species that exhibit different pumping speeds, differential pumping presents calibration problems. In the case of the hydrogen isotopes, more costly problems are created.

For example, in the European fusion project JET, the total cost of a Penning gauge-based tritium monitor was over ¼ million dollars. A major part of this cost was due to the fact that the differential pump had to be connected to the tritium recovery system. The system is necessary since tritium is radioactive and the total inventory in the facility is strictly regulated. Clearly, a Penning gauge capable of a high-pressure operation would lead to substantial cost savings.

Referring next to FIG. 2, an additional conventional Penning gauge diagnostic apparatus is shown, of which the present invention is a novel modification.

Specifically, the device of FIG. 2 includes a gauge tube 40 and a chamber 42 connected to the gauge tube 40 by a flange member 44. The gauge tube 40 houses an anode plate 46 and a pair of cathode plates 48 sandwiching the anode plate 46. The gauge tube 40 is at least partially surrounded by permanent magnets 50 and is supplied by a current from an HV power supply 52. The power supply 52 includes a current sensing resistor 54 connected to ground at the negative terminal 56 thereof, and a ballast resistor 58 between an anode connector 60 of the gauge tube 40 and a positive terminal 62 of the power supply 52.

The gauge tube 40 isolates the low-pressure gas inside the gauge from the atmosphere. It is made of non-magnetic material so that the magnetic field from the magnet coils 50 will penetrate to the active area inside. If the envelope is made of metal, it also serves to complete the electrical circuit from the cathode plates 48 to ground.

Figure 3:
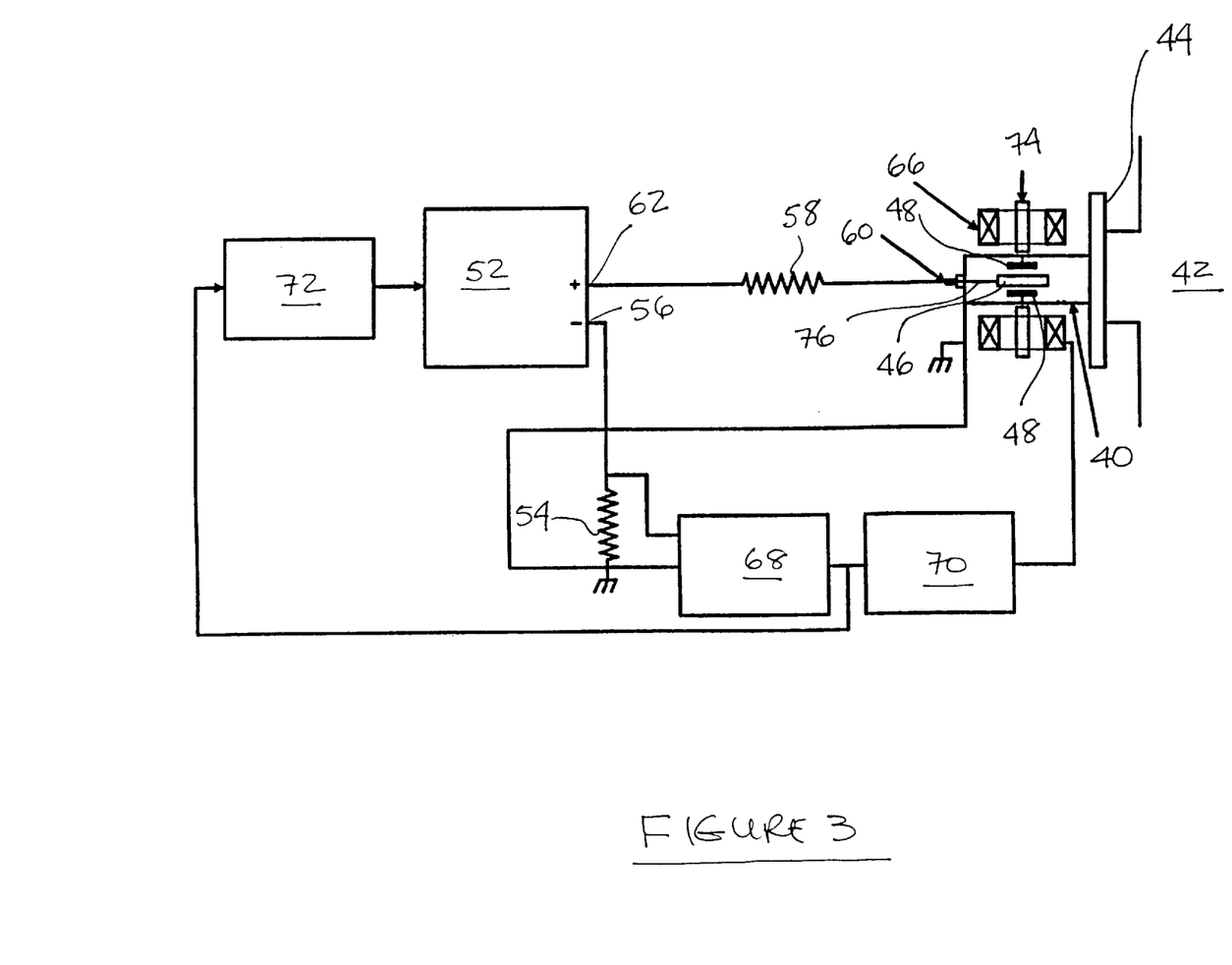
FIG. 3 is a schematic diagram showing a novel species-selective Penning gauge apparatus according to the present invention including a magnetic field feedback-control circuit for a modified Penning gauge with extended operational capability.
Figure 4:
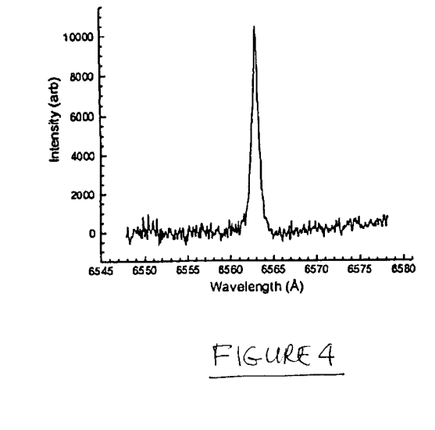
FIG. 4 is a typical optical emission spectrum in the spectral region containing the H-alpha line of hydrogen.

Referring now to FIG. 3, the present invention expands the range of applications of a diagnostic apparatus such as that shown in FIG. 2. The inventors have discovered, in response to recognizing the problems identified in connection with the conventional art, that weakening the magnetic field of the pressure gauge tube 40 allowed a shift of the saturation to a higher pressure. This led to the basis of the present invention, in which it was recognized that by continuously adjusting the magnetic field, so that the same current is measured, it is possible to continue measuring optically the partial pressures for a large range of pressures. Using this understanding, the inventors were able to operate the apparatus of FIG. 3 up to background pressures as high as 10 Pascal. As a result, this innovation will allow species-selective diagnostics to be applied to magnetic fusion devices without the need for differential pumping. In addition, the new pressure range exceeds what is needed for fusion and begins to overlap the pressure range of interest to several plasma processes used by the micro-electronics industry including those in the range of 10–100 Pa.

More specifically, and referring still to FIG. 3, the inventive apparatus includes a gauge tube 40 and a chamber 42 connected to the gauge tube 40 by a flange member 44. The gauge tube 40 houses an anode plate 46 and a pair of cathode plates 48 sandwiching the anode plate 46. The gauge tube 40 is at least partially surrounded by electromagnet coils 66 and is supplied by a current from an HV power supply 52. The power supply 52 includes a current sensing resistor 54 connected to ground at the negative terminal 56 thereof, and a ballast resistor 58 between an anode terminal 60 of the gauge tube 40 and a positive terminal 62 of the power supply 52.

In addition to those parts described above and the use of electromagnets 66, the inventive structure differs from that of the prior art in the following. In addition to the HV power supply 52, a feedback loop stabilizer 68 is connected to and receives input from the negative terminal 56 of the power supply 52. Additionally, the feedback loop stabilizer 68 is connected to the gauge tube 40. A magnet power amplifier 70 is positioned between an output of the feedback loop stabilizer 68 and the electromagnets 66. Finally, an optional voltage control 72 receives an output from each of the feedback loop stabilizer 68 and the magnet power amplifier 70, and in turn provides that signal to the power supply 52.

In more detail, the parts of the apparatus will be described in the following. The gauge tube 40 isolates a low-pressure gas inside the gauge tube from the atmosphere. The gauge tube 40 is made of non-magnetic material so that the magnetic field from the electromagnets 66 will penetrate to the active area inside. If the envelope is made of metal, it also serves to complete the electrical circuit from the cathode plates 48 to ground.

The flange 44 makes an airtight connection between the gauge tube 40 and the chamber 42 or piping containing gas to be analyzed. Light from the glowing plasma region is observed through the flange 44. Typically, a window would be installed in the chamber 42 or piping opposite the flange 44 to allow the light to pass to an optical spectrometer located outside the vacuum.

The electromagnetic coils 66 are known in the art and are, preferably, non-superconducting electromagnets. Two coils are used, arranged so that their magnetic fields aid each other. The magnetic field develops parallel to the axis of the coils, which is perpendicular to the cathode plates 48. The strength of the field is proportional to the electrical current flow through the windings of the electromagnets 66. In the gauge of the present invention, a DC current is used, which varies according to operating conditions. Due to symmetry in the construction of the gauge tube 40, the polarity of the magnetic field is not important. In the device shown, it is also possible to use permanent magnets. For example, magnets such as NdFeB having a field of about 1500 Gauss 3 mm from a surface of the tube may be used. Either one or two magnets may be used on each side of the tube, for a total of two or four magnets. This is by way of example only, and other magnet arrangements may be found to be appropriate for the intended use.

Pole pieces 74 complete the magnetic circuit outside the gauge tube 40. Completing the circuit concentrates more of the magnetic field from the coils into the active area inside the gauge tube 40.

The cathode plates 48 emit electrons and collect ions during operation. They are the part of the electrical circuit connecting to the negative side 56 of the power supply 52. For convenience in constructing the gauge tube 40, they are typically operated at the same potential as other external metal parts of the system (ground). The action of ions on the cathode plates 48 causes them to physically wear out after extended operation of hundreds to thousands of hours.

The anode 46 completes the electrical circuit through the gauge tube 40. The anode 46 collects those electrons eventually progressing to the outside edge of the active region. The anode 46 is connected to a variable positive voltage with respect to the cathode 48. The voltage of the variable positive voltage is typically 200 to 2000 volts.

A feedthrough 76 makes an air-tight electrical connection from the anode 46 to the outside of the housing 40. It is insulated from the chamber 42 so a high voltage can exist between the two parts. The feedthrough 76 is a known item.

In operation, any changes in the voltage applied to the gauge tube 40 (the anode-cathode potential) can also affect the saturation and can potentially extend the range beyond the limits of the magnetic field control. Very simply, as the pressure increases, the current output increases. By monitoring the discharge current, for example, it is possible to adjust the voltage and the magnetic field so as to maintain the discharge in a non-saturated state where the current will still increase with the pressure. Thus, the control and manipulation of these factors enables analysis above 1 Pascal, and at least up to 10 Pascal and higher, an accomplishment not previously found in the art.

The pressure ranges used in the present invention, preferably include an operating range of 0.1–100 Pa (about 1–1,000 mTorr) and a working range of 0.1–10 Pa (about 1–100 mTorr). The optimal range at this time is from 1–5 Pa (about 10–50 mTorr).

The discharge current is measured and may be used to control the voltage and magnetic field. As the current increases, the voltage and field decrease. Additionally, as the discharge current increases, the magnetic field decreases. Increases in current are caused by increases in pressure. So, generally, the magnetic field decreases as the pressure increases. This causes the discharge conditions inside the gauge tube to remain nearly constant, so that the optical measurements of species concentrations are unaffected by the background pressure.

For example, if the operating gauge has a background pressure that is increasing from 0.2 to 2 Pa (or from about 2 mTorr to 20 mTorr), the feedback circuit may cause the magnetic field coil current to decrease proportionally, so that the resulting magnetic field is also reduced proportionally.

Voltage is controlled similarly to the magnetic field. For any particular level of voltage, there is one magnetic field level. For example, in the above description, if the background pressure rose above 20 mTorr, the voltage applied to the tube may also have to be lowered, since lowering the magnetic field too much can cause the gauge to go unstable. The actual cutoff values depend upon the exact geometry of each gauge tube.

Figure 5:
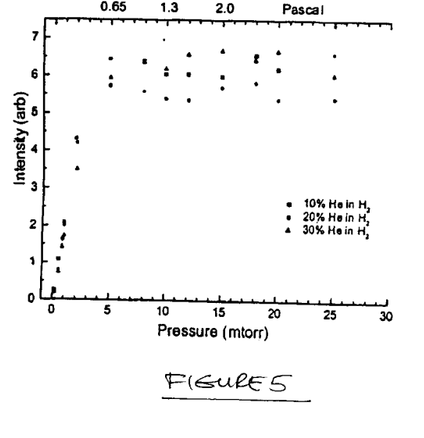
FIG. 5 is a graph of the hydrogen emission of FIG. 4 as a function of the gas pressure in a gauge tube.

FIG. 5 shows a graph of a hydrogen emission as a function of the gas pressure in the gauge tube for a commercial gauge tube. It should be noted that the intensity of the line varies over an order of magnitude and shows a clear saturation in the high-pressure range.

Figure 6:
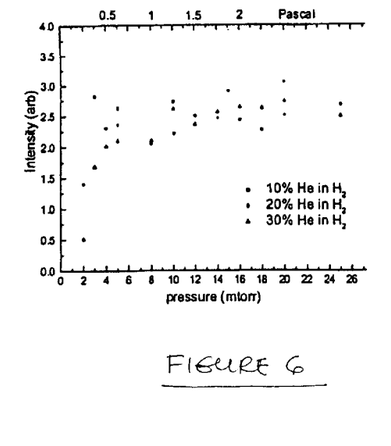
FIG. 6 is a graph of the hydrogen emission as a function of the gas pressure in the present invention in which intensity is maintained nearly constant.

FIG. 6 shows a graph of the hydrogen emission as a function of the gas pressure in the gauge tube of the present invention. It should be noted that the intensity is maintained nearly constant, thus preventing the emission from ever entering a saturated regime. Keeping the emission lines used for species concentration determination nearly constant has the added benefit of a measurement independent of the gas pressure.

The reason that the emission lines are nearly constant is that the discharge current is maintained nearly constant through feedback control.

Figure 7:
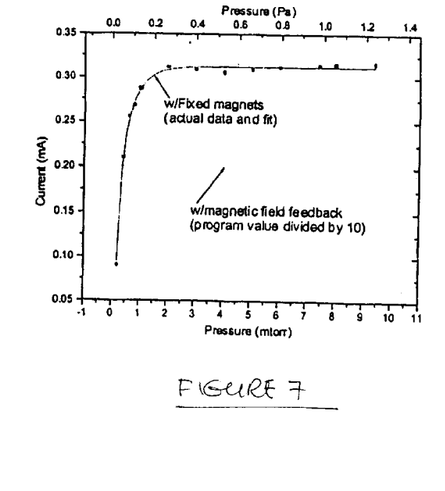
FIG. 7 is a graph showing the measured discharge current in a gauge tube as a function of the pressure with fixed magnetic field and the nearly constant discharge current which results from the applied magnetic field feedback control in the present invention.

FIG. 7 shows data from a commercial gauge in which the discharge current was measured as a function of the pressure (in hydrogen). Then the same gauge was modified to have a variable magnetic field. The field was adjusted manually at each pressure to keep the current constant as shown. It should be noted that with electronic or automated feedback control, the current may not be kept exactly constant as one can with manual control. However, correction can be made sufficiently to avoid large changes of the conditions in the gauge, which is primarily used to excite atomic line emission in the sampled gas.

Figure 8:
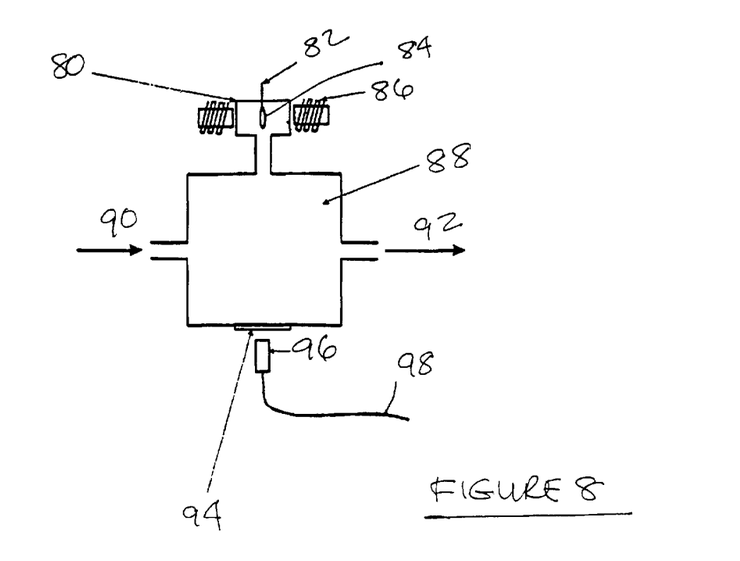
FIG. 8 is a schematic diagram of a set-up in accordance with the present invention in which the gauge measures partial concentration of small components of a gas mixture as a percentage of a primary gas.

The apparatus shown in FIG. 8 is an optional use of the invention in which the apparatus is for the measurement of species concentrations in the exhaust of a fusion experiment or of a plasma reactor used for materials processing. The apparatus includes a gauge envelope 80 having a variable voltage supplied at 82 to the anode 84. A variable current is supplied to magnet coils 86. A sample volume is contained within a chamber 88 and exhaust gas from, for example a fusion experiment or plasma process reactor, enters the chamber at 90 and gas is exhausted to a pump at 92. A viewing window is shown at 94, and a lens or lens system 96 is provided for viewing a glow inside of the gauge. An optical fiber 98 delivers information to a light detector or spectrometer.

Figure 10:
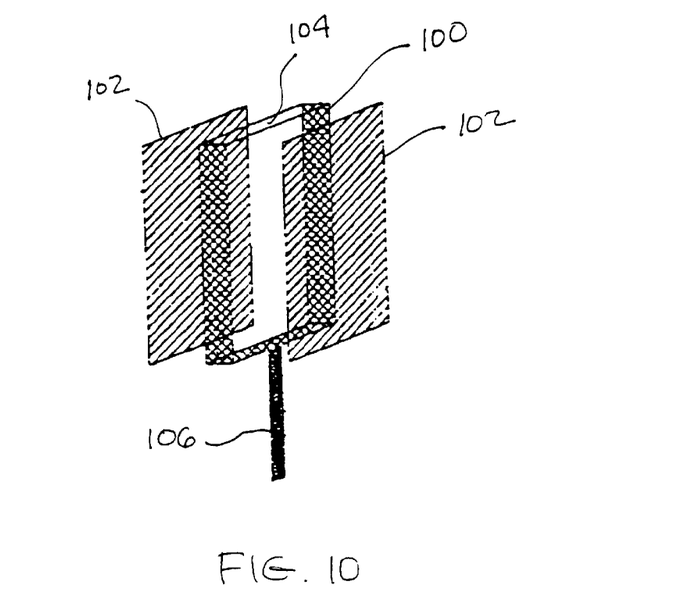
FIG. 10 is a schematic diagram of a preferred anode-cathode configuration.

FIG. 10 shows a preferable anode-cathode configuration for use in the apparatus of the invention, and particularly in species-selective measurements. As shown, a generally rectangularly-shaped hollow anode 100 is sandwiched between a pair of cathode plates 102. The cathode plates 102 would be attached to the envelope which is a part of the vacuum chamber at ground potential. The anode 100 is open at 104 to facilitate access to the light emission from the electrical discharge. This is important as the apparatus is primarily used to excite the optical emission from the otherwise cold, neutral gas. The anode stem 106 would be connected to a vacuum electrical feedthrough (not shown) for handling 2000 volts or more supplied to the anode 100 outside of the envelope.

Preferably, the anode 100 is about 2 cm wide and 4–5 mm high. The spacing between the cathode plates 102 is about 1 cm. The envelope would preferably be of rectangular cross-section.

Figure 11:
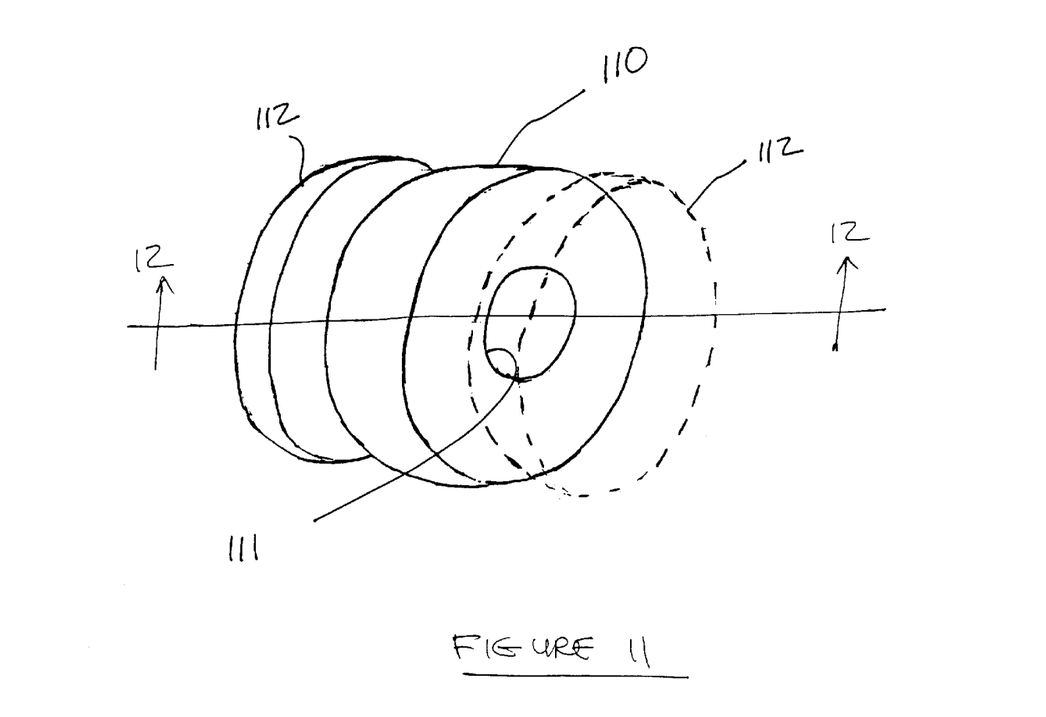
FIG. 11 is a schematic diagram of another preferred anode-cathode configuration, showing one of the cathodes in broken-lines for clarity.
Figure 12:
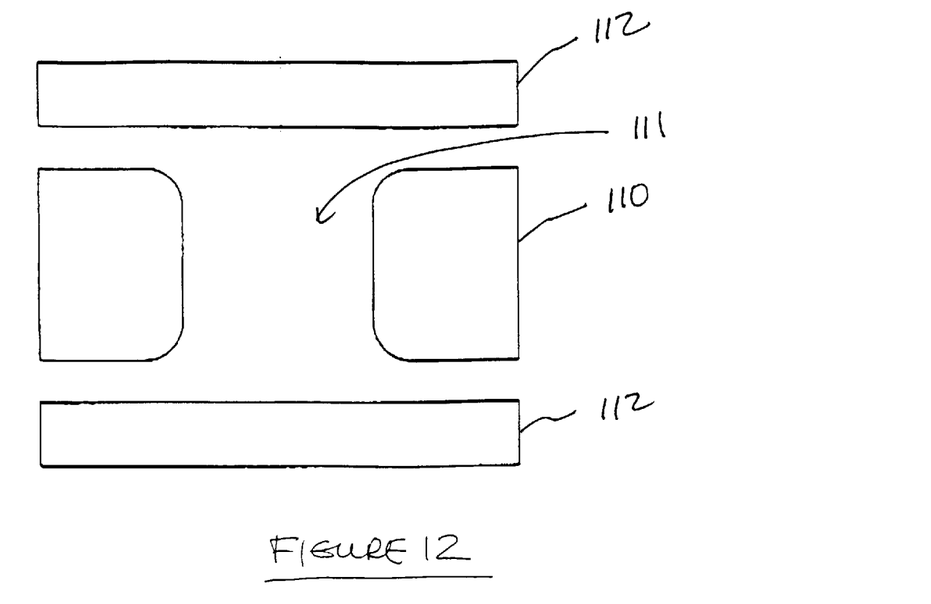
FIG. 12 is an enlarged cross-sectional view taken along line 12—12 of FIG. 11.

As shown in FIGS. 11 and 12, a generally-round anode 110, with a central opening 111, may be used with, preferably, correspondingly-shaped, generally round cathodes 112.

It was observed that the overall cylindrical configuration, presented by generally round anode 110 and cathodes 112, helps in stabilizing the electrical discharge in the gauge and prevents hopping to less luminous modes. The discharge might be further stabilized and made more luminous by selecting yet another shape for the anode as shown in FIG. 13.

Figure 13:
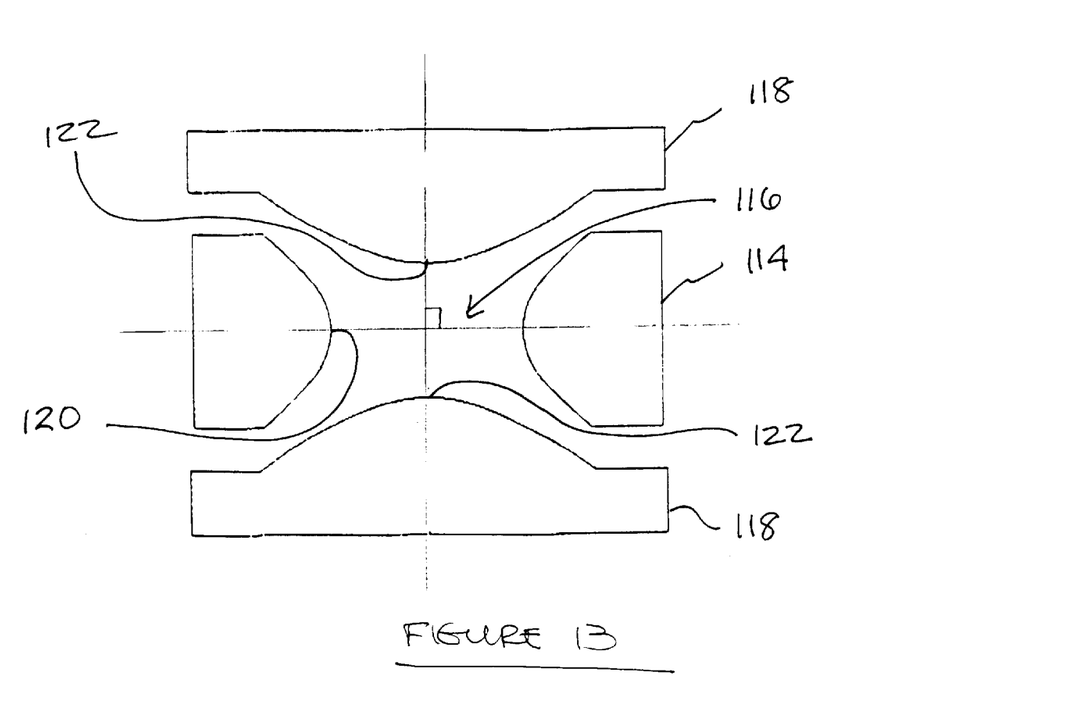
FIG. 13 is a view similar to FIG. 12, showing yet another preferred anode-cathode configuration.

FIG. 13 shows yet another preferred anode-cathode configuration. As illustrated, a generally round anode 114 includes a central opening 116, and is sandwiched between a pair of cathode plates 118. The anode 114 includes a radial projection 120 extending along the perimeter of the opening 116. The cathode plates 118 also include a central extension 122 projecting into the opening 116. As seen in FIG. 13, the extensions 122 are disposed generally opposite to each other and extend at right angle to the projection 120. It is noted herewith that it is within the scope of this invention to use anodes/cathodes of other shapes and configuration.

The purpose of the gauge is to measure the partial concentration of small components of a gas mixture as a fraction (or percentage) of a primary (working) gas. A typical example is to monitor helium concentration in the exhaust of a future Fusion reactor, which, like the sun, will burn hydrogen (or one of its isotopes) and produce helium as the ash. Another example is to monitor the exhaust of a plasma-processing reactor, such as used to etch a silicon wafer and form a micro-electronic component or a micro-machine. In this case, an etch by-product or an environmental pollutant would be monitored in the background of the etching gas (e.g. chlorine).

Changes in pressure cause proportional changes in the discharge current. The feedback circuit senses the changes and rapidly adjusts the parameters to prevent the change and maintain the conditions in the gauge tube unchanged (constant). As noted, the primary function of this instrument involves the measurement of the light emission from the discharge for species concentration monitoring. However, the corrective action of the feedback circuit is also potentially a measure of the background gas pressure and this instrument could be used as a pressure gauge for the pressure state above 1 Pa (about 10 mTorr), which is high for typical ionization gauges.

Figure 9:
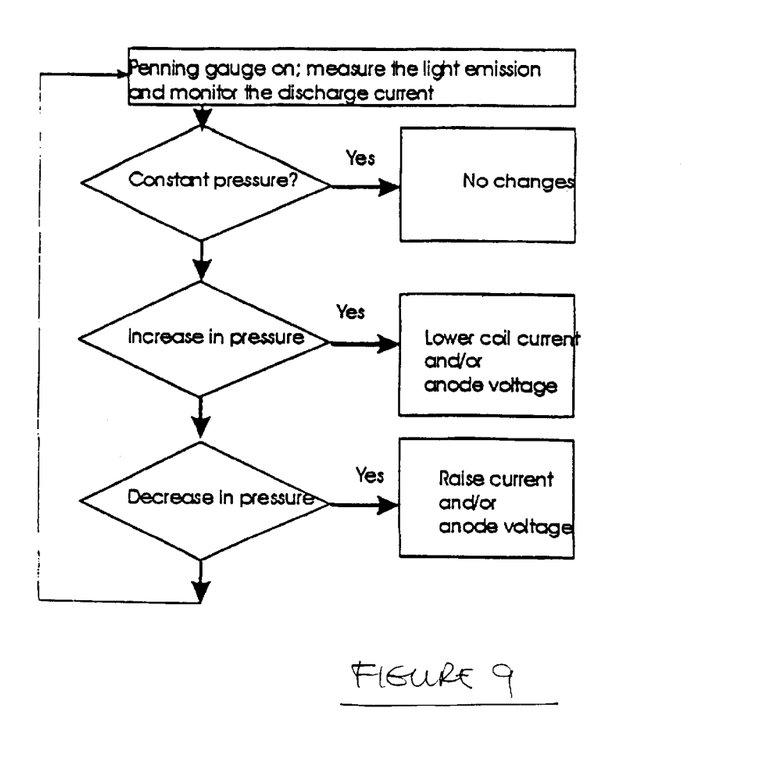
FIG. 9 is a flowchart describing the function of the feedback circuit.

The flow chart in FIG. 9 describes the function of the feedback circuit, which continuously monitors the discharge current, which is a measure of the total gas pressure and attempts to adjust the current to keep the discharge in a non-saturated state. A non-saturated state is where the current would still increase with pressure. Ideally, the feedback circuit maintains the current nearly constant. The optical emission signals from the gas components of interest are related to the discharge current. Therefore, they also remain nearly constant.

Electronics are needed for feedback control of the magnetic field. FIG. 9 shows the concept for the electronics circuit, which would provide the feedback control of the magnetic field in a commercial sensor based on the present invention. Alternatively, the feedback circuit is further able to allow for control of the gauge voltage as well as the electromagnetic current.

Accordingly, the present invention can operate at least up to 10 Pa background pressure, has calibration abilities nearly independent of the background pressure, and enables fast feedback control allowing for stable operation with varying background pressure.

Clearly, saturation levels are never reached when using an electromagnet, thus allowing for higher pressures than previously known at a constant current. When the current output increases, the supply to the electromagnet is decreased, thus enabling a continued operation, independent of rise in pressure.

It should be recognized that possible alternatives to the description provided herein include cold-cathode gauge tubes of different design than the Penning gauge which may have advantages such as a higher upper limit to the pressure range. It is also possible that the choice of alternative cathode materials may impact the pressure range. In particular, materials with a higher ion-induced secondary electron emission coefficient may be effective in this respect.

Additionally, the uses of the present invention are not limited to that described herein. The inventive device can also be used for effluent gas analysis in magnetic fusion energy devices; effluent gas analysis in plasma processing; detection of pollutants from industrial exhaust; measurement of He in a $D_2$ background (which is very difficult with mass spectroscopy); measurement of hydrogenic isotope ratios; or any other number of uses too numerous to mention here.

While this invention has been described as having preferred designs, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims. It is further understood that the present invention is not limited to the claims appended hereto.

What is claimed is:

1. A diagnostic apparatus, comprising:
  a) a pressure gauge member including an anode, a cathode, an anode connector, and a lead for connecting said anode to said anode connector;
  b) a power supply for supplying power to said anode connector, said power supply including a positive terminal and a negative terminal;
  c) a resistor connected to each of the positive terminal of said power supply and the anode connector of said gauge;
  d) at least one electromagnet positioned adjacent said gauge member, said electromagnet having a pole for completing a magnetic circuit;
  e) a power amplifier for supplying varying power to said electromagnet; and
  f) a feed back circuit connected to said gauge, said power supply, and said power amplifier for proportionally and selectively changing a strength of said electromagnet upon detecting an opposing change in current discharge from said gauge.

2. The apparatus according to claim 1, wherein:
  a) said power supply is a high voltage power supply.

3. The apparatus according to claim 1, wherein:
  a) said resistor is a ballast resistor.

4. The apparatus according to claim 1, further comprising:
  a) a current sensing resistor connecting the negative terminal of said power supply to ground.

5. The apparatus according to claim 1, wherein:
  a) said feedback circuit includes a feedback loop stabilizer connected to each of said magnet power amplifier, the negative terminal of said power supply, and said anode connector of said gauge;
  b) wherein said feedback loop stabilizer either supplies additional power to said anode connector in response to an increase in internal pressure of said gauge or amplifies the magnetic field in response to a decrease in internal pressure of said gauge.

6. The apparatus according to claim 1, further comprising:
  a) a voltage control member for controlling a voltage input to said power supply in response to either a change in internal pressure of said gauge, a change in discharge voltage, or a change in magnetic field.

7. The apparatus according to claim 5, further comprising:
  a) a voltage control member for controlling a voltage input to said power supply in response to either a change in internal pressure of said gauge, a change in discharge voltage, or a change in magnetic field.

8. The apparatus according to claim 6, wherein:
  a) as a discharge current increases in response to an increase in internal pressure of said gauge, a voltage and magnetic field are decreased.

9. The apparatus according to claim 6, wherein:
  a) as an internal pressure of said gauge increases, a voltage applied to said magnetic field is decreased, thereby preventing a proportional increase in discharge current.

10. The apparatus according to claim 1, wherein:
  a) said gauge is a Penning gauge.

11. The apparatus according to claim 1, wherein:
  a) said anode comprises a generally rectangularly-shaped electrode with an opening.

12. The apparatus according to claim 1, wherein:
  a) said anode comprises a generally round electrode with a central opening.

13. The apparatus according to claim 12, wherein:
  a) said anode includes a radially extending projection extending into said opening.

14. The apparatus according to claim 13, wherein:
  a) said projection extends along the perimeter of said opening.

15. The apparatus according to claim 14, wherein:
  a) said cathode includes a central portion extending into said opening.

16. The apparatus according to claim 15, wherein:
  a) a pair of said cathodes each includes a central portion extending into said opening; and
  b) said central portions extend generally opposite to each other.

17. A method for assembling and monitoring a diagnostic apparatus, comprising the steps of:
  a) providing a pressure gauge member including an anode, a cathode, an anode connector, and a lead for connecting said anode to said anode connector;
  b) supplying power from a power source to said anode connector, said power source including a positive terminal and a negative terminal;
  c) connecting a resistor to each of the positive terminal of said power source and the anode connector of said gauge member;
  d) positioning at least one electromagnet adjacent said gauge, said electromagnet having a pole for completing a magnetic circuit;
  e) supplying varying power from a power amplifier to said electromagnet; and
  f) connecting a feed back circuit to said gauge, said power source, and said power amplifier for proportionally and selectively changing a strength of said electromagnet upon detecting an opposing change in current discharge from said gauge.

18. The method according to claim 17, wherein:
said step of supplying power is with a high voltage power source.

19. The method according to claim 17, wherein:
said resistor in said step of connecting a resistor comprises a ballast resistor.

20. The method according to claim 17, further comprising:
   g) providing a current sensing resistor connecting the negative terminal of said power supply to ground.

21. The method according to claim 17, wherein:
   said step of providing a feedback circuit includes providing a feedback loop stabilizer connected to each of said magnet power amplifier, the negative terminal of said power supply, and said anode connector of said gauge; and
   wherein said feedback loop stabilizer either supplies additional power to said anode connector in response to a decrease in internal pressure of said gauge, or amplifies the magnetic field in response to a decrease in internal pressure of said gauge.

22. The method according to claim 17, further comprising:
   g) controlling a voltage input to said power supply with a voltage control member in response to either a change in internal pressure of said gauge, a change in discharge voltage, or a change in magnetic field.

23. The method according to claim 21, further comprising:
   g) controlling voltage input to said power supply with a voltage control member in response to either a change in internal pressure of said gauge, a change in discharge voltage, or a change in magnetic field.

24. The method according to claim 22, wherein:
   as a discharge current increases in response to an increase in internal pressure of said gauge, a voltage and magnetic field are decreased.

25. The method according to claim 22, wherein:
   as an internal pressure of said gauge increases, a voltage applied to said magnetic field is decreased, thereby preventing proportional increase of the discharge current of said gauge.

26. The method according to claim 17, wherein:
   said gauge is a Penning gauge.

27. A diagnostic apparatus, comprising:
   a) a pressure gauge including an anode and a cathode;
   b) a power supply for supplying power to said anode;
   c) a resistor connected to said power supply and said anode;
   d) an electromagnet positioned adjacent said gauge;
   e) a power amplifier for supplying varying power to said electromagnet; and
   f) a feed back circuit connected to said gauge, said power supply, and said power amplifier for selectively changing a strength of said electromagnet upon detecting an opposing change in current discharge from said gauge.

* * * * *